United States Patent
Deras Arreola et al.

(10) Patent No.: US 10,372,921 B2
(45) Date of Patent: Aug. 6, 2019

(54) DYNAMIC SECURITY POLICIES

(71) Applicant: International Business Machines Corporation, Armonk, NY (US)

(72) Inventors: Sergio Jose Deras Arreola, Guadalajara (MX); Alejandra Sarahi Galindo Copado, Zapopan (MX); Victor Adrian Sosa Herrera, Tlaquepaque (MX)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 15/459,378

(22) Filed: Mar. 15, 2017

(65) Prior Publication Data
US 2018/0268149 A1   Sep. 20, 2018

(51) Int. Cl.
*G06F 21/00* (2013.01)
*G06F 21/60* (2013.01)
*G06F 21/62* (2013.01)
*G06F 21/31* (2013.01)
(Continued)

(52) U.S. Cl.
CPC .......... *G06F 21/604* (2013.01); *G06F 21/31* (2013.01); *G06F 21/6209* (2013.01); *H04W 12/06* (2013.01); *H04W 12/08* (2013.01); *G06F 2221/2149* (2013.01)

(58) Field of Classification Search
CPC .... G06F 21/601; G06F 21/6209; G06F 21/31; G06F 21/604; G06F 2221/2149; H04W 12/06; H04W 12/08
See application file for complete search history.

(56) References Cited

U.S. PATENT DOCUMENTS

| 7,650,342 B2 | 1/2010 | Sugiyama et al. |
| 2012/0023573 A1* | 1/2012 | Shi ...................... G06F 3/04883 726/17 |
| 2013/0333020 A1 | 12/2013 | Deshpande |

(Continued)

OTHER PUBLICATIONS

Enterprise Mobility Management, "Transform Business with Comprehensive Enterprise Mobility Management", Copyright 2016 VMware, Inc., 4 pages.

(Continued)

*Primary Examiner* — Joseph P Hirl
*Assistant Examiner* — Chi D Nguy
(74) *Attorney, Agent, or Firm* — Scott S. Dobson; Madeline F. Schiesser; Keohane & D'Alessandro PLLC (57) ABSTRACT

Approaches presented herein enable dynamic security policies through a plurality of application profiles. More specifically, a mobile device can open a profile of a plurality of profiles, each associated with an unlock credential and a security scope, in response to an unlock credential associated with that profile. All these profiles can be opened in a single user session and can be swapped within the session in response to an unlock credential corresponding to the desired profile. When the mobile device receives a request to open a digital item, the digital item is compared to a security scope of the opened profile to determine whether access to the digital item is permitted, and, in response to the determination, access to the digital item is permitted or denied. A list of digital items permitted to be accessed in each profile can be synchronized to a list received from a mobile device manager.

20 Claims, 6 Drawing Sheets

(51) Int. Cl.
*H04W 12/06* (2009.01)
*H04W 12/08* (2009.01)

(56) References Cited

U.S. PATENT DOCUMENTS

| | | | | |
|---|---|---|---|---|
| 2014/0331273 A1* | 11/2014 | Koneru | .................. | H04L 63/20 |
| | | | | 726/1 |
| 2015/0334217 A1* | 11/2015 | Braden | .................. | G06F 21/31 |
| | | | | 455/411 |
| 2017/0374074 A1* | 12/2017 | Stuntebeck | ........... | H04L 63/102 |

OTHER PUBLICATIONS

Jesse Miller, Nexus, "How to Create Multiple User Profiles on Your Nexus 5 Phone", Jan. 30, 2014, 11 pages.
"About Touch ID security on iPhone and iPad", Copyright 2016 Apple Inc., 3 pages.
501 Commons, "Security Policies for Mobile Devices", Dec. 4, 2012, 4 pages.
Dallas Thomas, "How to Set Up Multiple User Profiles on Your Galaxy S5—or Any Other Android Phone", Dated Aug. 22, 2014, 12 pages.

* cited by examiner

DYNAMIC SECURITY POLICIES

TECHNICAL FIELD

The present invention relates generally to security policies on a client device and, more specifically, to managing security policies for a set of applications on a user device.

BACKGROUND

Mobile devices, such as smartphones and tablet computers, are important tools for organizations, including business enterprises. However, these mobile devices also present a risk to information and data security because, for example, if appropriate security applications and procedures are not applied, mobile devices can be a conduit for unauthorized access to an organization's data and information technology (IT) infrastructure, which can subsequently lead to data leakage and system infection.

One of the challenges facing IT departments can include securing both privately owned and corporate mobile devices. Users do not always recognize that mobile devices can represent a threat to IT and data security and, as a result, often do not apply the same security and data protection guidelines as they would on other devices, such as desktop computers. Further, when users provide their own device, they often give greater weight to their own rights on the device than to their employer's need to protect data.

SUMMARY

Approaches presented herein enable dynamic security policies through a plurality of application profiles. More specifically, a mobile device can open a profile of a plurality of profiles, each associated with an unlock credential and a security scope, in response to an unlock credential associated with that profile. All these profiles can be opened in a single user session and can be swapped within the session in response to an unlock credential corresponding to the desired profile. When the mobile device receives a request to open a digital item, the digital item is compared to a security scope of the opened profile to determine whether access to the digital item is permitted, and, in response to the determination, access to the digital item is permitted or denied. A list of digital items permitted to be accessed in each profile can be synchronized to a list received from a mobile device manager.

One aspect of the present invention includes a computer-implemented method for dynamic security policies, the computer-implemented method comprising: establishing a plurality of profiles within a user account on a mobile device, wherein each profile corresponds to a different unlock credential of a plurality of unlock credentials associated with the user account and each profile is associated with a security scope of a plurality of security scopes within the user account; unlocking the user account on the mobile device in response to receipt of an unlock credential of the plurality of unlock credentials; opening, in response to the unlock credential, a profile of the plurality of profiles corresponding with the unlock credential on the mobile device, wherein the opened profile can be swapped dynamically for a different profile of the plurality of profiles within a same user session in response to receipt of a different unlock credential of the plurality of unlock credentials; receiving a request to open a digital item on the mobile device; determining, by comparing the requested digital item to a security scope of the plurality of security scopes associated with the opened profile, whether access to the digital item is permitted; and permitting access to the digital item responsive to a determination that access to the digital item is allowed and denying access to the digital item responsive to a determination that access to the digital item is not allowed.

Another aspect of the present invention includes a computer system for dynamic security policies, the computer system comprising: a memory medium comprising program instructions, the program instruction comprising a plurality of profiles within a user account on a the computer system, wherein each profile corresponds to a different unlock credential of a plurality of unlock credentials associated with the user account and each profile is associated with a security scope of a plurality of security scopes within the user account; a bus coupled to the memory medium; and a processor, for executing the program instructions, coupled to an applications profile manager via the bus that when executing the program instructions causes the system to: unlock the user account in response to receipt of an unlock credential of the plurality of unlock credentials; open, in response to the unlock credential, a profile of the plurality of profiles corresponding with the unlock credential, wherein the opened profile can be swapped dynamically for a different profile of the plurality of profiles within a same user session in response to receipt of a different unlock credential of the plurality of unlock credentials; receive a request to open a digital item on the computer system; determine, by comparing the requested digital item to a security scope of the plurality of security scopes associated with the opened profile, whether access to the digital item is permitted; and permit access to the digital item responsive to a determination that access to the digital item is allowed and denying access to the digital item responsive to a determination that access to the digital item is not allowed.

Yet another aspect of the present invention includes a computer program product for dynamic security policies, the computer program product comprising a computer readable storage device, and program instructions stored on the computer readable storage device, to: establish a plurality of profiles within a user account on a mobile device, wherein each profile corresponds to a different unlock credential of a plurality of unlock credentials associated with the user account and each profile is associated with a security scope of a plurality of security scopes within the user account; unlock the user account on the mobile device in response to receipt of an unlock credential of the plurality of unlock credentials; open, in response to the unlock credential, a profile of the plurality of profiles corresponding with the unlock credential on the mobile device, wherein the opened profile can be swapped dynamically for a different profile of the plurality of profiles within a same user session in response to receipt of a different unlock credential of the plurality of unlock credentials; receive a request to open a digital item on the mobile device; determine, by comparing the requested digital item to a security scope of the plurality of security scopes associated with the opened profile, whether access to the digital item is permitted; and permit access to the digital item responsive to a determination that access to the digital item is allowed and denying access to the digital item responsive to a determination that access to the digital item is not allowed.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for dynamic security policies through a plurality of application profiles. More specifically, a mobile device can open a profile of a plurality of profiles, each associated with an unlock credential and a security scope, in response to an unlock credential associated with that profile. All these profiles can be opened in a single user session and can be swapped within the session in response to an unlock credential corresponding to the desired profile. When the mobile device receives a request to open a digital item, the digital item is compared to a security scope of the opened profile to determine whether access to the digital item is permitted, and, in response to the determination, access to the digital item is permitted or denied. A list of digital items permitted to be accessed in each profile can be synchronized to a list received from a mobile device manager.

Figure 1:
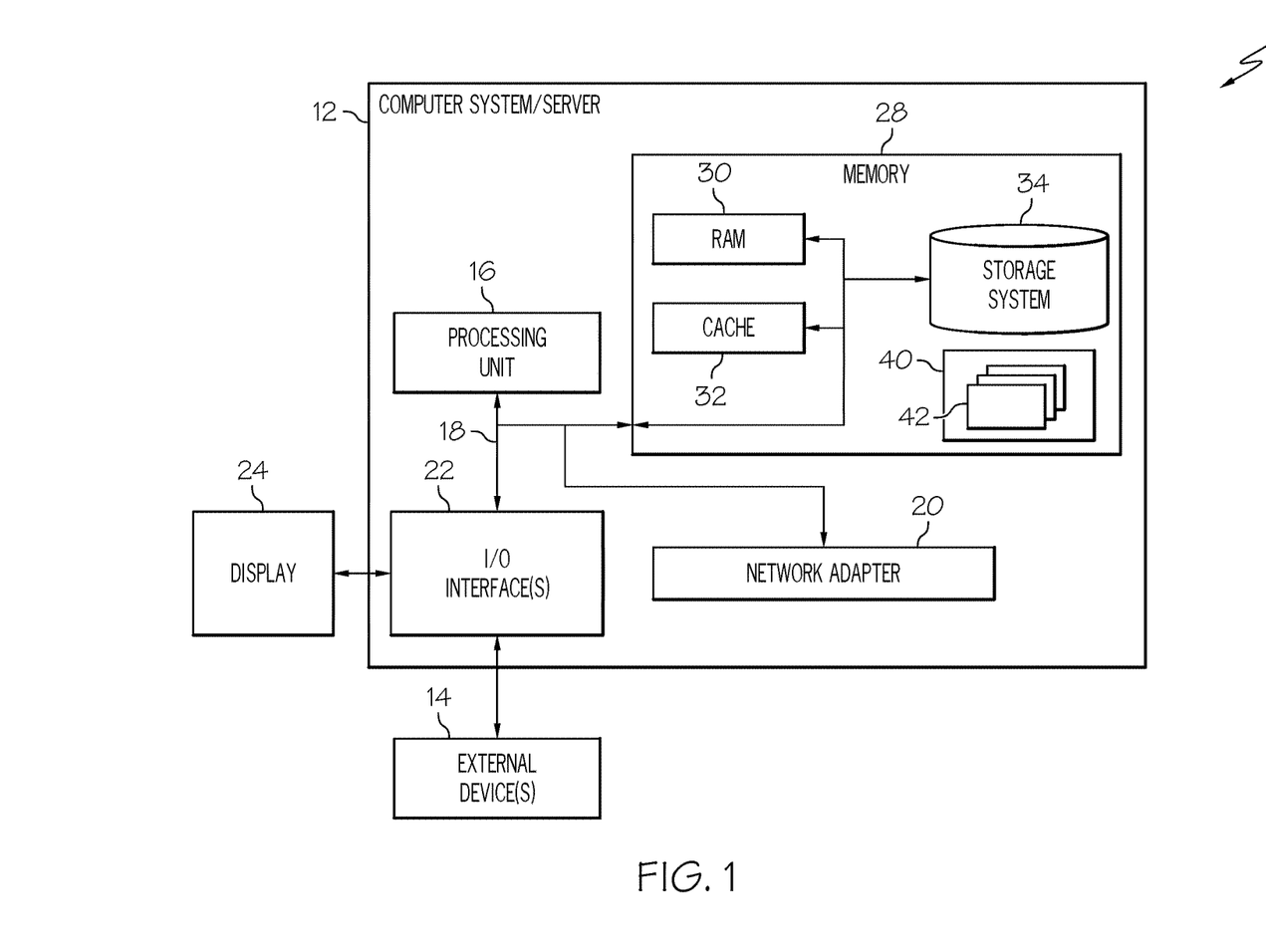
FIG. 1 shows an architecture in which the invention may be implemented according to illustrative embodiments.

Referring now to FIG. 1, a computerized implementation 10 of an embodiment for providing dynamic security policies through a plurality of application profiles will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for providing dynamic security policies through a plurality of application profiles. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for providing dynamic security policies through a plurality of application profiles, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that mobile device security has become a significant concern in recent years. Many times, enterprise security policies require mobile devices, such as smart phones and tablets, to have strong security measures, which are highly enforced. Such security measures can include, but are not limited to, a biometric security system (e.g., fingerprint, facial image, voice) and/or a complex password, passcode, or pattern system. Once a mobile device has been configured with such security measures, it becomes necessary to provide credentials satisfying these measures before each use of the device. Therefore, regardless of whether a user wants to use the device to access an application having sensitive information (e.g., a banking application) or an application having little to no sensitive information (e.g., a SMS application), the user must provide credentials satisfying all heightened security measures. This makes the usability of the mobile device more complex than is often necessary, merely because the device contains a mix of applications with different security scopes/policies for a single user.

Accordingly, the inventors of the present invention have developed a system and method to allow a user to access low-security information and applications on a mobile device account, which also contains high-security information and applications that necessitate strong security credentials, without having to enter the strong security credentials. According to embodiments of the present invention, an applications profile manager stored on a mobile user device can identify an unlocking mechanism, which corresponds to a profile of a plurality of profiles within a user account, used to unlock the mobile device and permit a user to open only explicitly allowed applications for the unlocked profile. This applications profile manager is able to load the same user session (i.e., account) with different applications profiles, thus allowing the user to keep one single session for many profiles without restarting the device or otherwise changing accounts or sessions. Advantages provided by embodiments of the present invention include, but are not limited to, ease of unlocking a device by a user for casual purposes, protecting sensitive information (e.g., a folder containing a client list or trade secrets) and applications (e.g., a corporate email application) stored on the device, and balancing a user's need to readily access information on his device with an employer or organization's need to secure sensitive information.

Generally, embodiments of the present invention provide a plurality of profiles in one single user's account, each corresponding with a security level and each having a different security credential necessary to access that profile. Depending on the security credential the user supplies when unlocking his or her mobile device account, a particular profile will be accessed. Each profile has a set of applications that can be accessed by that profile based on the security level of the profile. In other words, in a low-level security profile within a user account, access to sensitive information and applications are restricted and not accessible. On the other hand, in a high-level security profile within the same user account, the user would be permitted access to all applications and information up to a threshold corresponding to that high level. In another instance, in a high-level security profile, applications which are considered to be a security risk (e.g., a recording application) can be restricted or disabled.

For example, a user who merely wishes to use her mobile device to find a recipe online may unlock her device through a low-level security measure (e.g., a swipe or a pattern swipe). This triggers a low-level security profile which permits the user to access nonsensitive applications, such as a mobile browser or text-messengering application, but not sensitive applications, such as a corporate email application. Conversely, if the user unlocks her device through a high-level security measure (e.g., thumbprint and/or password), a higher-level security profile will be triggered, giving the user access to sensitive information and applications, such as the corporate email application. Accordingly, embodiments of the present invention allow a user to use a single mobile device to access sensitive information restricted behind strong security credentials as well as to access nonsensitive information and applications without having to enter the strong security credentials.

Figure 2:
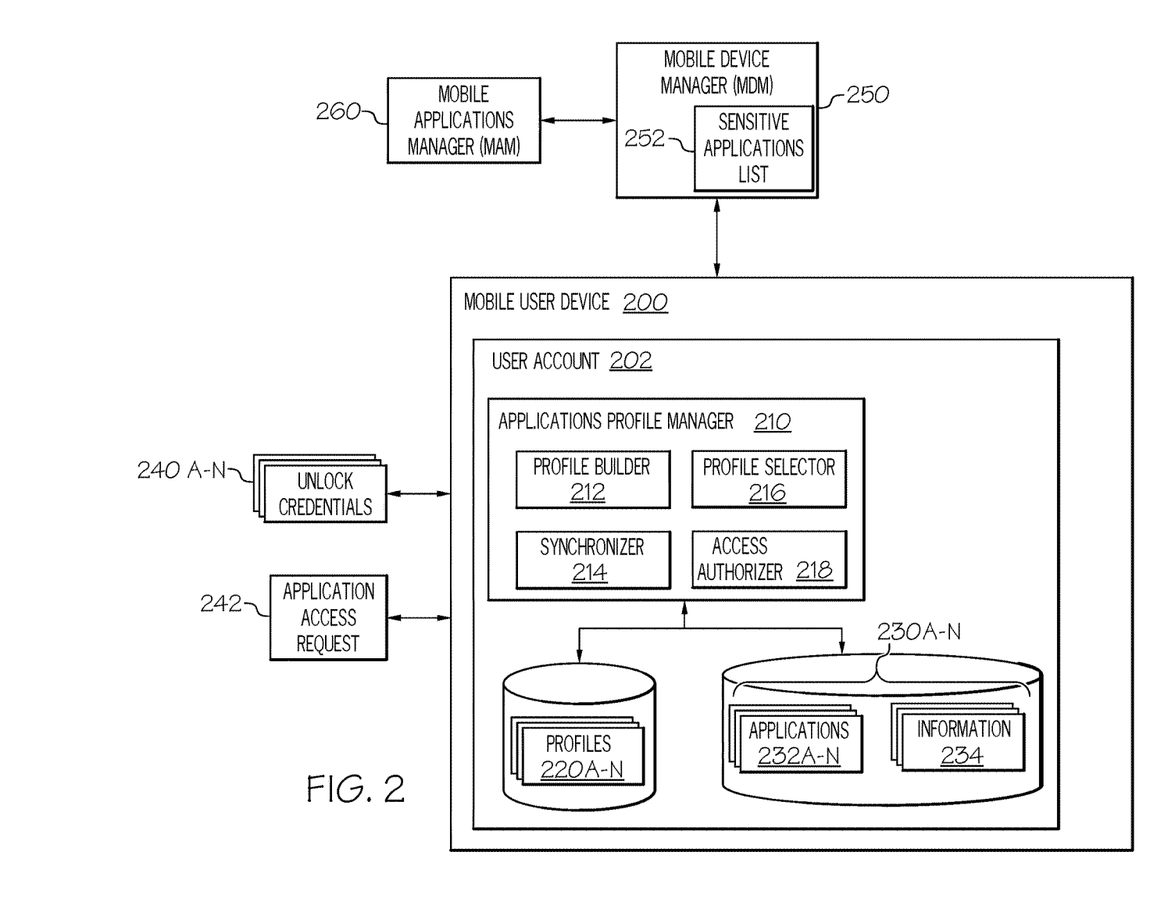
FIG. 2 shows a more detailed system architecture for providing dynamic security policies through a plurality of application profiles according to illustrative embodiments.

Referring now to FIG. 2, a more detailed system architecture for providing dynamic security policies through a plurality of application profiles according to illustrative embodiments is shown. Computer system/server 12 (FIG. 1) can include or be included within a mobile user device, such as mobile user device 200. Mobile user device 200 can be, for example, a smartphone, a tablet, a tablet computer, or any other personal device of a user. Mobile user device 200 can include user account 202, which in turn can include applications profile manager 210 for carrying out embodiments of the present invention. In some embodiments, applications profile manager 210 can be a program/utility 40 of FIG. 1. Applications profile manager 210 can contain a set of components (e.g., program modules 42 of FIG. 1) for carrying out embodiments of the present invention, including profile builder 212, synchronizer 214, profile selector 216, and access authorizer 218.

User account 202 can further include a set of profiles 220A-N, each having a security scope, in a storage or memory such as storage system 34 (FIG. 1). Mobile user device 200 can include digital items 230A-N, such as a set of applications 232A-N or information 234, each having a security sensitivity, in a storage or memory such as storage system 34 or memory 28 (FIG. 1). I/O interface 22 (FIG. 1) of mobile user device 200 can receive input from a user, including an unlock credential 240N of unlock credentials 240A-N and application access request 242.

User account 202 and/or applications profile manager 210 can further be in contact with Mobile Device Manager (MDM) 250, having a list 252 of sensitive applications or applications that require security, and Mobile Applications Manager (MAM) 260. In some embodiments, MDM 250 and MAM 260 can be located on another local device, a server, or remotely in a cloud environment.

Profile builder 212 of applications profile manager 210 can configure or be used to configure profiles 220A-N of user account 202 for various security scopes/policies. Profiles 220A-N can each be configured to have, for example, different unlock credentials, different types of credentials, multiple credentials, or tiers of credentials. In some embodiments, profiles 220A-N can be configured by a user through profile builder 212. In this case, the user may first begin with a default profile containing all digital items 230A-N, including applications 232A-N installed and information 234 stored on mobile user device 200 at the moment applications profile manager 210 is first installed on device 200. This default profile can be associated with the unlock credential (e.g., a security passcode) at the time of install or otherwise currently in use. The user may then create one or more additional profiles 220A-N that each have a particular security scope and access rights to applications 232A-N and information 234 within user account 202. The user can configure the additional profiles to each unlock in response, for example, to a different passcode or to different types of credentials, such as a thumbprint or voice code.

In some embodiments, profile builder 212 can automatically configure profiles 220A-N by, for example, assigning digital items 230A-N, including information 234 and/or applications 232A-N, stored on mobile user device 200 to security tiers and then assigning each tier (optionally including any lower tier) to a different profile 220A-N having different unlock credentials. In still further embodiments, profile builder 212 can be instructed by an outside party, such as an organization or employer of the user, through MAM 260 and/or MDM 250 to configure profiles 220A-N according to instructions designating particular applications 232A-N and information 234 on mobile user device 200 to security tiers and/or minimum security credential requirements. For example, in order to make applications profile manager 210 more enterprise ready, MDM 250, which in some embodiments can control mobile devices, can pass sensitive/secure applications list 252 to profile builder 212 in order to restrict access to the applications on list 252 to a high-tier profile. In some embodiments, MDM 250 can also synchronize changes in unlock credentials 240A-N across multiple devices, so that, for example, when a user changes a password corresponding to one profile, that new password can be used on other devices of the user having the same profile.

It should be understood that profiles 220A-N as described herein permit a plurality of alternative modes in applications profile manager 210 of user account 202. Each profile 220A-N contains a list of digital items 230A-N that a user can and/or cannot access when that profile is active. In some embodiments, each profile 220A-N can correspond to a tier of security that digital items 230A-N accessible therein require. In other embodiments, each profile 220A-N can be treated as having a same level of security and merely permit access to different applications. In still further embodiments, a profile of profiles 220A-N can be a child-safe profile that restricts access not only to digital items 230A-N that are sensitive, but also to any content that a child should not be permitted to access, such as a credit card application, a game with a high maturity rating, or the Internet.

Each profile 220A-N corresponds to a different unlock credential 240N. Each credential 240N can be any type of unlock credentials, such as, for example, a personal identification number (PIN), a passcode, a password, a pattern, or a biometric, although some credentials 240A-N can be the same type of unlock credential, such as, for example, two or more different passwords. In some embodiments, profile builder 212 can require a user to set more robust unlock credentials for more sensitive profiles requiring heightened security.

In some embodiments, some profiles 220A-N can permit access to all digital items 230A-N of a second profile in addition to that of the current profile. This could occur if, for example, the second profile has a lower security level, and is therefore less restrictive, than the current profile, thereby allowing the higher security requirements of the current profile to also satisfy the security requirements of the second profile. In some other embodiments, some profiles 220A-N can restrict applications in high security profiles that would otherwise be accessible in lower security profiles. This could occur if, for example, certain applications, such as a camera, a microphone, or a wireless Internet connection, from a lower security profile were considered to be potential security risks.

It should further be understood that in embodiments of the present invention, profiles 220A-N exist within a single user account 202. This single user account 202 corresponds to one user. No matter which unlock credential 240N of unlock credentials 240A-N is entered to unlock mobile device 200, the same user account 202 will be unlocked and opened. Profiles 220A-N are security modes within user account 202 and are not associated with different users or with separate user accounts. Rather, profiles 220A-N allow a user to change a security scope/policy dynamically within his or her user account 202 during the unlocking of the device by selecting an unlock credential 240N associated with that security scope/policy.

Figure 3:
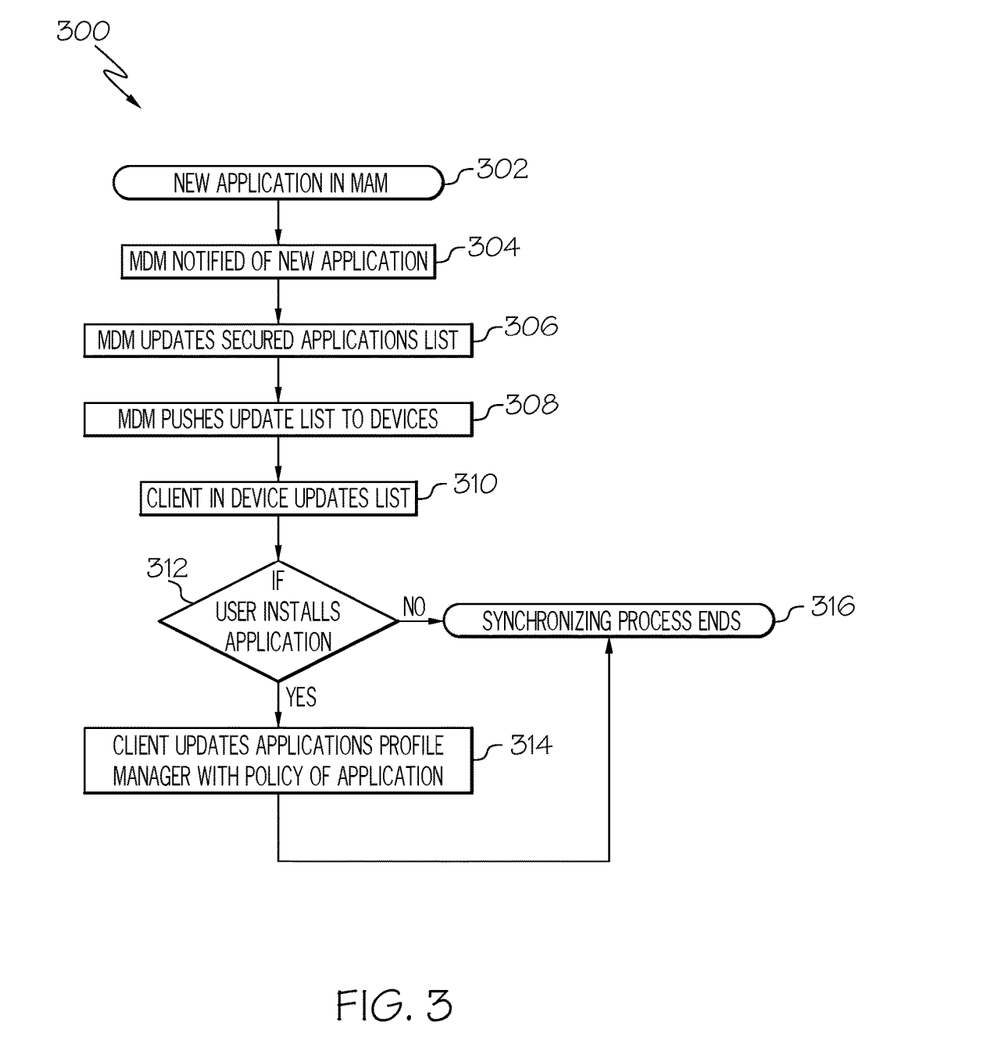
FIG. 3 shows synchronization of a secure applications list from a mobile device manager to a mobile user device having an applications profile manager according to illustrative embodiments.

Referring now to FIG. 3, synchronization 300 of sensitive/secure applications list 252 from MDM 250 to mobile user device 200 having applications profile manager 210 is shown according to illustrative embodiments. In some embodiments, once applications profile manager 210 is placed on a device and profiles 220A-N are established, as described above with reference to FIG. 2, an outside party, such as an organization or employer of the user, or the user in the case that the user has multiple devices, can instruct applications profile manager 210 to place particular digital items 230A-N (e.g., applications and information) in profiles having additional security.

In some embodiments, MAM 260 may be used by a user or another party, such as a network administrator, to remotely install, update, remove, audit, and/or monitor, for example, software programs installed on mobile user device 200. When an administrator or other user edits, adds, or otherwise pushes, at 302, a new digital item entry, such as an application or set of information (e.g., an application provided by or otherwise used by an enterprise or a folder containing confidential files), to MAM 260, he or she can also indicate an application security policy, such as an associated security or sensitivity of the application and/or a type or level of security measures requisite to operate the application on a mobile user device connected to an enterprise. At 304, MDM 250, which is in communication with or otherwise linked with MAM 260, receives notice from MAM 260 of the new or edited application entry and application security policy in MAM 260. MDM 250 updates sensitive/secured applications list 252 at 306 with the application entry and application security policy.

One or more mobile user devices 200 can be registered with MDM 250 as a certified device within a company or enterprise. MDM 250 can then push sensitive/secured applications list 252 to synchronizer 214 in a client of each registered mobile user devices 200 at 308 to permit mobile user devices 200 to synchronize list 252 of MDM 250 with a list stored on mobile user device 200 at 310. This permits mobile user device 200 to remain up to date as to which applications and sensitive information should be in secure user profiles.

At 312, synchronizer 214 can verify if the application added or edited in sensitive/secured applications list 252 was, is, or is being, installed on mobile user device 200 or if the sensitive information is stored on mobile user device 200. In the case that the application is not installed on or sensitive information is not stored on mobile user device 200, synchronization 300 of sensitive/secure applications list 252 from MDM 250 to mobile user device 200 ends at 316. However, in the case that the application is installed on or sensitive information is stored on mobile user device 200, at 314, synchronizer 214 assigns digital item 230N (e.g., application or sensitive information) to one or more profiles in which digital item 230N can be opened according to the application security policy from sensitive/secured applications list 252.

Figure 4:
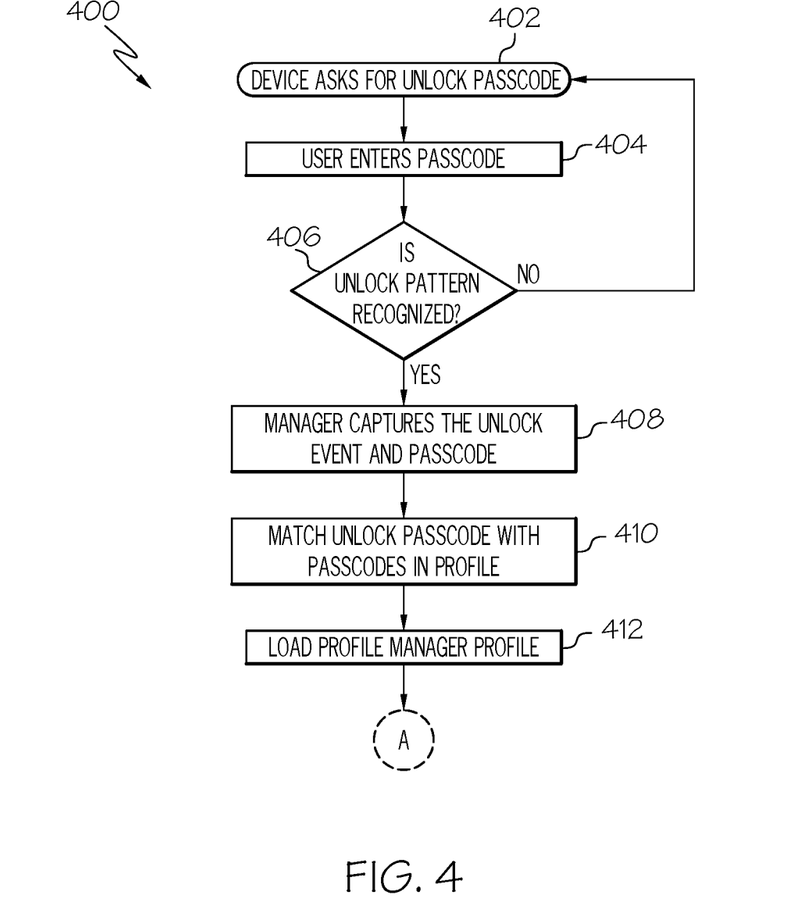
FIG. 4 shows unlocking the mobile user device having the applications profile manager and a plurality of profiles according to illustrative embodiments.

Referring now to FIG. 4, unlocking mobile user device 200 having applications profile manager 210 and plurality of profiles 220A-N associated with user account 202 is shown according to illustrative embodiments. A user may trigger a process to unlock mobile user device 200 and access user account 202 by performing an action, such as touching a screen of device 200 or pressing a button on device 200, that indicates that he or she would like to unlock mobile user device 200. The triggered unlock process prompts the user for an unlock passcode or other unlock credential 240N, at 402. The user can select an unlock credential 240N from a plurality of unlock credentials 240A-N, each corresponding to a different profile 220A-N having a different security scope/policy. This allows the user to choose a security scope in which to access user account 202. Furthermore, each time that the user unlocks device 200, he or she can chose a different security scope for accessing user account 202, thereby making the security scope of user account 202 dynamic. At 404, the user may enter the unlock passcode or other unlock credential 240N (e.g., PIN, password, pattern, biometric) into a user interface, such as a screen, on mobile user device 200. In some embodiments, in the case that mobile user device 200 does not, at 406, recognize unlock credential 240N, mobile user device 200 can again prompt the user for an unlock passcode and/or display an error message.

In the case that mobile user device 200 does, at 406, recognize unlock credential 240N, mobile user device 200 will unlock. At 408, profile selector 216 captures the unlock event and unlock credential 240N. Profile selector 216 then matches unlock credential 240N with a profile 220N, having the security scope/policy desired by the user, of plurality of profiles 220A-N, at 410. Based on the match of unlock credential 240N and profile 220N, profile selector 216 loads the matched profile 220N, at 412, for controlling a security scope of user account 202 and access to digital items 230A-N, such as information 234 and applications 232A-N, on mobile user device 200.

Figure 5:
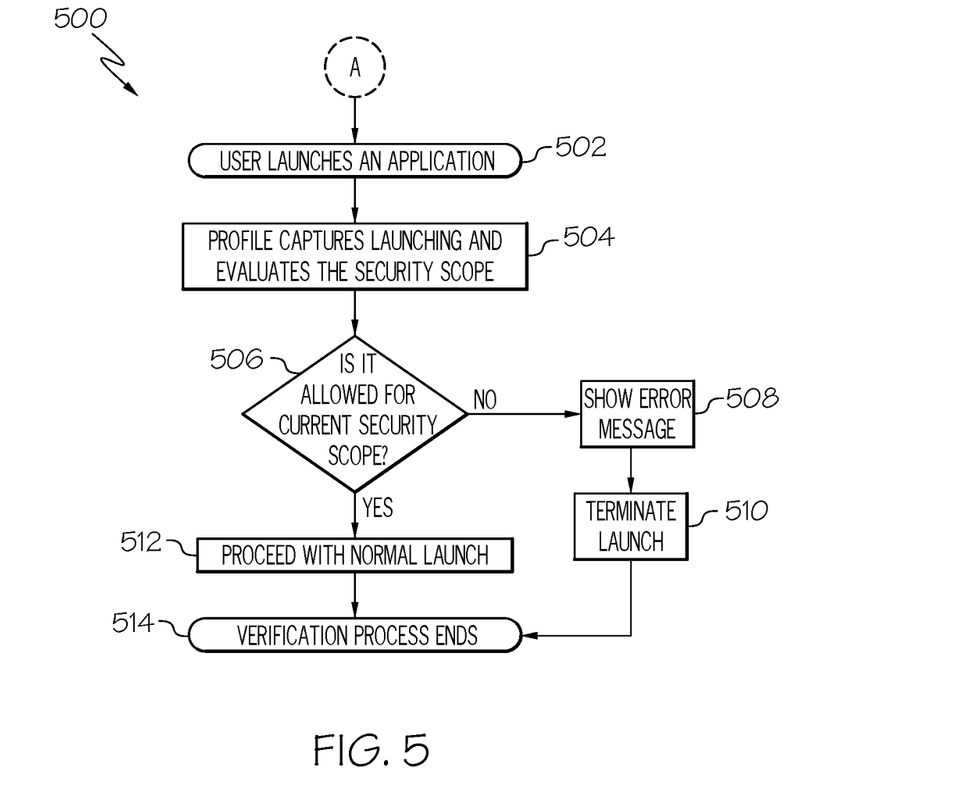
FIG. 5 shows verifying a request to open an application in the mobile user device having the applications profile manager running a particular profile of the plurality of profiles according to illustrative embodiments.

Referring now to FIG. 5, verifying a request to open an application in mobile user device 200 having applications profile manager 210 running a particular profile of plurality of profiles 220 is shown according to illustrative embodiments. After a user unlocks mobile user device 200 with unlock credential 240N, as described above with reference to FIG. 4, and profile selector 216 loads profile 220N corresponding to unlock credential 240N and having the security scope/policy desired by the user, the user can interact with device 200 as he or she normally would. When, at 502, mobile user device 200 receives request 242 from the user (e.g., by touching a screen of the mobile device corresponding to an item) to open digital item 230N (e.g., launch application 232N or open information 234) stored on device 200, request 242 is routed to access authorizer 218 of applications profile manager 210. Access authorizer 218 captures request 242 and the launching or opening, at 504, and compares launching application 232N or opening information 234 with the security scope/policy of profile 220N, which includes a list of digital items 230A-N which can and/or cannot be accessed when mobile user device 200 is running profile 220N.

If, at 506, access authorizer 218 determines that the requested digital items 230A-N is not within the scope of the security policy of profile 220N, access authorizer 218 can show an error message at 508 (e.g., an alert, such as a textual message, a displayed error symbol, a sound, a haptic vibration) and/or terminate the launch of application 232N or opening of information 234 at 510. In some embodiments, the user may be given the opportunity to provide an additional unlock credential 240N corresponding with a different profile 220N in which requested digital items 230A-N can be opened. If the user provides the additional unlock credential 240N, then profile selector 216 will open the different profile 220N corresponding with that unlock credential.

Conversely, at 506, access authorizer 218 can determine that requested digital item 230N is within the scope of the security policy of profile 220N (e.g., by finding digital item 230N on a list of items a user is permitted to access when running the profile). Access authorizer 218 can then, at 512, permit mobile user device 200 to launch or open requested digital items 230A-N (e.g., application 232N or requested information 234) as mobile user device 200 would normally without the presence of applications profile manager 210, ending the verification process at 514.

Figure 6:
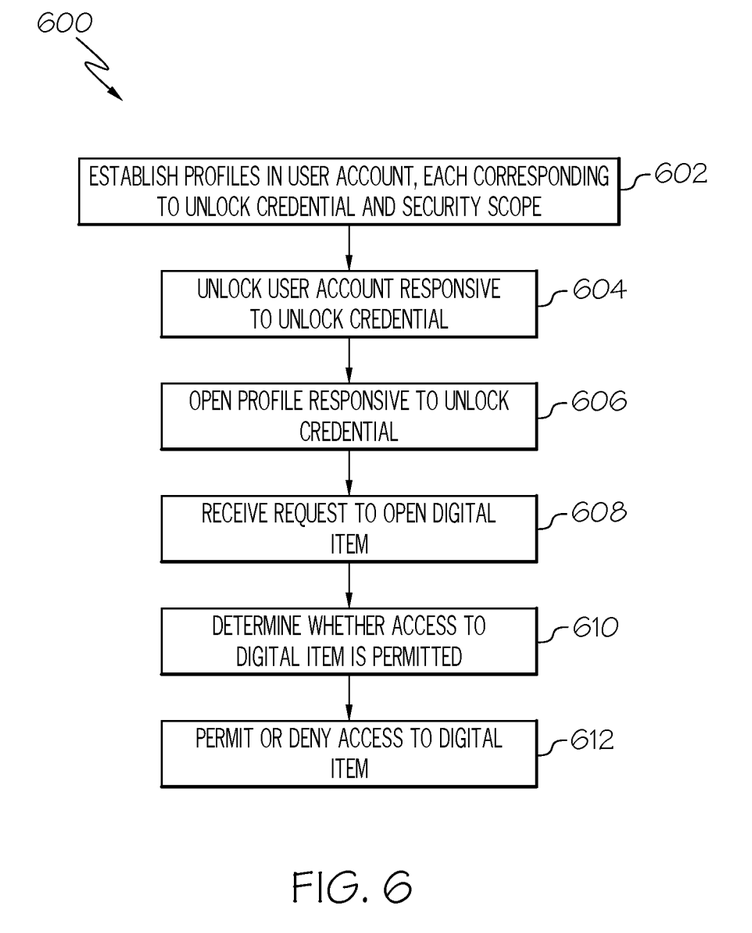
FIG. 6 shows a process flowchart for providing dynamic security policies through a plurality of application profiles according to illustrative embodiments.

As depicted in FIG. 6, in one embodiment, a system (e.g., computer system 12) carries out the methodologies disclosed herein. Shown is a process flowchart 600 for providing dynamic security policies through a plurality of application profiles. At 602, profile builder 212 of applications profile manager 210 establishes plurality of profiles 220A-N within user account 202 on mobile device 200, wherein each profile 220N corresponds to a different unlock credential 240N of plurality of unlock credentials 240A-N associated with user account 202 and each profile 220N is associated with a security scope of a plurality of security scopes within user account 202. At 604, user account 202 unlocks on mobile device 200 in response to receipt of unlock credential 240N of plurality of unlock credentials 240A-N. At 606, profile selector 216 of applications profile manager 210 opens, in response to unlock credential 240N, profile 220N of plurality of profiles 220A-N corresponding with unlock credential 240N on mobile device 200, wherein opened profile 240N can be swapped dynamically for a different profile of plurality of profiles 220A-N within a same user session in response to receipt of a different unlock credential of the plurality of unlock credentials 240A-N. At 608, access authorizer 218 of applications profile manager 210 receives a request to open digital item 230N on mobile device 200. At 610, access authorizer 218 of applications profile manager 210 determines whether access to digital item 230N is permitted by comparing requested digital item 230N to a security scope of the plurality of security scopes associated with opened profile 220N. At 612, access authorizer 218 permits access to digital item 330N responsive to a determination that access to digital item 230N is allowed, and denies access to the digital item 330N responsive to a determination that access to digital item 330N is not allowed.

Process flowchart 600 of FIG. 6 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for providing dynamic security policies through a plurality of application profiles. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for providing dynamic security policies through a plurality of application profiles. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to provide dynamic security policies through a plurality of application profiles. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for dynamic security policies, the computer-implemented method comprising:
    establishing a plurality of profiles within a user account on a mobile device, wherein each profile corresponds to a different unlock credential of a plurality of unlock credentials associated with the user account and each profile is associated with a security scope of a plurality of security scopes within the user account;
    unlocking the user account on the mobile device in response to receipt of a first unlock credential of the plurality of unlock credentials;
    opening, in response to the first unlock credential, a first profile of the plurality of profiles corresponding with the first unlock credential on the mobile device, wherein the opened first profile can be swapped dynamically for a different profile of the plurality of profiles within a same user session in response to receipt of a different unlock credential of the plurality of unlock credentials;
    receiving a request to open a digital item on the mobile device;
    determining, by comparing the requested digital item to a security scope of the plurality of security scopes associated with the opened first profile, whether access to the digital item is permitted;
    issuing a request, subsequent to access to the digital item being denied under all security scopes of the plurality of security scopes associated with the opened first profile, for a second unlock credential associated with a second profile having a security scope permitting access to the requested digital item;
    replacing the first profile with the second profile in the same user session responsive to receipt of the second unlock credential; and
    permitting access to the digital item responsive to the replacement.

2. The method of claim 1, the method further comprising:
    responsive to access to the digital item being allowed, opening the digital item; and
    responsive to access to the digital item not being allowed, providing an error message.

3. The method of claim 1, the method further comprising:
    capturing the unlock credential used to unlock the user account;
    identifying the opened profile of the plurality of profiles based on correspondence to the captured unlock credential; and performing the opening of the profile in response to the identifying.

4. The method of claim 1, the method further comprising, responsive to access to the digital item being denied, displaying an error message to the user, the error message being a message type selected from the group consisting of: a textual message, a displayed error symbol, a sound, and a haptic vibration.

5. The method of claim 1, wherein at least one security scope of the plurality of security scopes comprises a list of digital items stored on the mobile device to which access is allowed for that security scope.

6. The method of claim 5, the method further comprising:
receiving a list of digital items designated as requiring an enhanced security mechanism from a mobile device manager at a client of the mobile device; and
synchronizing the list of designated digital items to the at least one security scope, wherein the mobile device is registered to the mobile device manager through the client.

7. The method of claim 1, wherein the mobile device comprises a plurality of digital items stored thereon, wherein the plurality of digital items comprises at least an application or sensitive information, and wherein each digital item is assigned to at least one profile of the plurality of profiles.

8. The method of claim 1, wherein at least one of the plurality of unlock credentials is a type of unlock credential selected from the group consisting of: a password, a passcode, a PIN, a pattern, and a biometric.

9. A computer system for dynamic security policies, the computer system comprising:
a memory medium comprising program instructions, the program instruction comprising a plurality of profiles within a user account on a the computer system, wherein each profile corresponds to a different unlock credential of a plurality of unlock credentials associated with the user account and each profile is associated with a security scope of a plurality of security scopes within the user account;
a bus coupled to the memory medium; and
a processor, for executing the program instructions, coupled to an applications profile manager via the bus that when executing the program instructions causes the system to:
unlock the user account in response to receipt of an unlock credential of the plurality of unlock credentials;
open, in response to the unlock credential, a profile of the plurality of profiles corresponding with the unlock credential, wherein the opened profile can be swapped dynamically for a different profile of the plurality of profiles within a same user session in response to receipt of a different unlock credential of the plurality of unlock credentials;
receive a request to open a digital item on the computer system;
determine, by comparing the requested digital item to a security scope of the plurality of security scopes associated with the opened profile, whether access to the digital item is permitted;
issue a request, subsequent to access to the digital item being denied under all security scopes of the plurality of security scopes associated with the opened first profile, for a second unlock credential associated with a second profile having a security scope permitting access to the requested digital item;
replace the first profile with the second profile in the same user session responsive to receipt of the second unlock credential; and
permit access to the digital item responsive to the replacement.

10. The computer system of claim 9, the instructions further causing the system to:
responsive to access to the digital item being allowed, open the digital item; and
responsive to access to the digital item not being allowed, provide an error message.

11. The computer system of claim 9, the instructions further causing the system to:
capture the unlock credential used to unlock the user account;
identify the opened profile of the plurality of profiles based on correspondence to the captured unlock credential; and
perform the opening of the profile in response to the identifying.

12. The computer system of claim 9, the instructions further causing the system, responsive to access to the digital item being denied, to display an error message to the user, the error message being a message type selected from the group consisting of: a textual message, a displayed error symbol, a sound, and a haptic vibration.

13. The computer system of claim 9, wherein at least one security scope of the plurality of security scopes comprises a list of digital items stored on the computer system to which access is allowed for that security scope, wherein the instructions further cause the system to:
receive a list of digital items designated as requiring an enhanced security mechanism from a device manager at a client of the computer system; and
synchronize the list of designated digital items to the at least one security scope, wherein the computer system is registered to the device manager through the client.

14. The computer system of claim 9, wherein the computer system comprises a plurality of digital items stored thereon, wherein the plurality of digital items comprises at least an application or sensitive information, and wherein each digital item is assigned to at least one profile of the plurality of profiles.

15. The computer system of claim 9, wherein at least one of the plurality of unlock credentials is a type of unlock credential selected from the group consisting of: a password, a passcode, a PIN, a pattern, and a biometric.

16. A computer program product for dynamic security policies, the computer program product comprising a computer readable hardware storage device having program instructions embodied therewith, the program instructions executable by a processor to:
establish a plurality of profiles within a user account on a mobile device, wherein each profile corresponds to a different unlock credential of a plurality of unlock credentials associated with the user account and each profile is associated with a security scope of a plurality of security scopes within the user account;
unlock the user account on the mobile device in response to receipt of an unlock credential of the plurality of unlock credentials;
open, in response to the unlock credential, a profile of the plurality of profiles corresponding with the unlock credential on the mobile device, wherein the opened profile can be swapped dynamically for a different profile of the plurality of profiles within a same user session in response to receipt of a different unlock credential of the plurality of unlock credentials;

receive a request to open a digital item on the mobile device;

determine, by comparing the requested digital item to a security scope of the plurality of security scopes associated with the opened profile, whether access to the digital item is permitted;

issue a request, subsequent to access to the digital item being denied under all security scopes of the plurality of security scopes associated with the opened first profile, for a second unlock credential associated with a second profile having a security scope permitting access to the requested digital item;

replace the first profile with the second profile in the same user session responsive to receipt of the second unlock credential; and permit access to the digital item responsive to the replacement.

17. The computer program product of claim 16, the computer readable storage device further comprising instructions to:

responsive to access to the digital item being allowed, open the digital item; and responsive to access to the digital item not being allowed, provide an error message.

18. The computer program product of claim 16, the computer readable storage device further comprising instructions to:

capture the unlock credential used to unlock the user account;

identify the opened profile of the plurality of profiles based on correspondence to the captured unlock credential; and perform the opening of the profile in response to the identifying.

19. The computer program product of claim 16, the computer readable storage device further comprising instructions, responsive to access to the digital item being denied, to display an error message to the user, the error message being a message type selected from the group consisting of: a textual message, a displayed error symbol, a sound, and a haptic vibration.

20. The computer program product of claim 16, wherein at least one security scope of the plurality of security scopes comprises a list of digital items stored on the mobile device to which access is allowed for that security scope, wherein the computer readable storage device further comprises instructions to:

receive a list of digital items designated as requiring an enhanced security mechanism from a mobile device manager at a client of the mobile device; and synchronize the list of designated digital items to the at least one security scope, wherein the mobile device is registered to the mobile device manager through the client.

* * * * *